United States Patent [19]

Anderson

[11] 3,923,989

[45] Dec. 2, 1975

[54] NITRO SUBSTITUTED PICOLINONITRILES AS ANTI-BACTERIAL AND ANTI-FUNGAL AGENTS

[75] Inventor: Paul L. Anderson, Dover, N.J.

[73] Assignee: Sandoz Inc., East Hanover, N.J.

[22] Filed: Aug. 20, 1974

[21] Appl. No.: 498,955

Related U.S. Application Data

[60] Continuation-in-part of Ser. No. 379,008, July 13, 1973, abandoned, which is a division of Ser. No. 207,558, Dec. 13, 1971, Pat. No. 3,770,751.

[52] U.S. Cl. ................................................ 424/263
[51] Int. Cl.² ........................................ A61K 31/44

[58] Field of Search ..................................... 424/263

[56] References Cited
OTHER PUBLICATIONS

Chemical Abstracts 68:8394r (1968).

*Primary Examiner*—Jerome D. Goldberg
*Attorney, Agent, or Firm*—Gerald D. Sharkin; Robert S. Honor; Thomas O. McGovern

[57] ABSTRACT

Nitro substituted picolinonitriles, in particular 3-nitro-picolinonitrile, have been found to be useful as anti-bacterial and anti-fungal agents.

21 Claims, No Drawings

NITRO SUBSTITUTED PICOLINONITRILES AS ANTI-BACTERIAL AND ANTI-FUNGAL AGENTS

This application is a continuation-in-part of copending U.S. Pat. application Ser. No. 379,008, filed July 13, 1973 now abandoned, which in turn is a division of U.S. Pat. application Ser. No. 207,558, filed Dec. 13, 1971, which issued as U.S. Pat. No. 3,770,751 on Nov. 6, 1973.

This invention relates to the use of nitro substituted picolinonitriles in the treatment of bacteria and fungus infections. The invention also relates to anti-bacterial and anti-fungal compositions containing nitro substituted picolinonitriles as the active ingredient thereof.

The active agents with which this invention is concerned may be represented by the following structural formula:

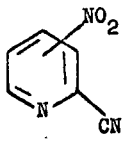

and pharmaceutically acceptable acid addition salts thereof.

The compounds of formula (I) above are known and may be prepared according to methods disclosed in the literature from known materials. The compound of formula (I) in which the nitro group is in the 3-position may be prepared by the following novel reaction scheme:

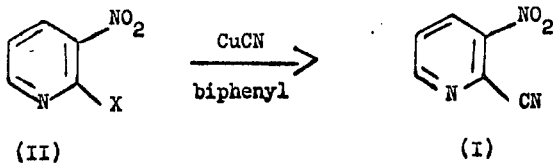

where X is halo having an atomic weight of about 35 to 80.

The compounds of formula (I) are prepared by heating the compound of formula (II) in the presence of cuprous cyanide and biphenyl at the melting point of the reactant mixture. The temperature of the melting point is not critical and will vary, but it is preferred that the reaction be run in excess of 200°C. The time also is not critical, but for optimum results it is preferred that the heating be continued for a period in excess of 3 hours or more after the melting point is reached. The product is isolated by conventional techniques, e.g., extraction and chromatography.

The compounds represented by formula (I) above are useful as anti-bacterial and anti-fungal agents, in particular as anti-mycotic agents, as indicated in conventional serial dilution tests by their activity at concentrations of 1 to 100 micrograms per milliliter in vitro against the organisms below. The lowest inhibiting concentration range for the compounds of formula (I) for each organism is shown in the right hand column.

| ORGANISMS | DOSAGE (ug/ml) |
|---|---|
| Haem. Escherichia coli | 1.25 to 12.5 |
| Pseudomonas species | 25 to 100 |
| Proteus vulgaris | 6.25 to 12.5 |
| Salmonella typhimurium | 1.25 to 12.5 |
| Staphylococcus aureus SG 511 | 3.12 to 12.5 |
| B-haem. Streptococcus Lancefield Group A | 1.25 to 6.25 |
| Streptococcus faecalis | 25 to 50 |
| Candida albicans (124) | 50 |
| Escherichia coli 04 | 1.25 to 12.5 |
| Escherichia coli D 10 | 1.25 to 12.5 |
| Proteus mirabillis | 10 to 25 |
| Proteus vulgaris SFI-Nr. 57 | 12.5 to 25 |
| Proteus vulgaris SFI-Nr. 58 | 10 to 25 |
| Pseudomonas fluorescens | 100 |
| Aerobacter aerogenes | 1.25 to 25 |
| Salmonella heidelberg | 1.25 to 25 |
| Klebsiella sp. | 1.25 to 25 |
| Klebsiella pneumoniae | 1.25 to 25 |
| Shigella flexneri | 1.25 to 12.5 |
| Micrococcus oxford | 1.25 to 6.25 |
| Staphylococcus albus 5226 | 5 to 6.25 |
| Staphylococcus aureus smith | 2.5 to 5 |
| Staphylococcus arueus ATCC 10390 | 5 to 10 |
| Staphylococcus aureus ATCC 14154 (pen-res) | 3.12 to 6.25 |
| Streptococcus aronson | 100 |
| Streptococcus lactis | 50 to 100 |
| Corynebacterium equi | 3.12 to 12.5 |
| Erysipelothrix | 10 to 12.5 |
| Andida albicans (42) | 50 |
| Escherichia Coli (120) | 1.25 to 12.5 |

For such usages, compounds (I) may be administered orally, parenterally or topically as such or admixed with conventional pharmaceutical carriers. They may be administered orally in such forms as tablets, dispersible powders, granules, capsules, syrups and elixirs; parenterally as solutions, suspensions, dispersions, emulsions, and the like; e.g., a sterile injectable aqueous suspension and topically as tinctures, ointment or creams. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc; granulting and disintegrating agents, e.g., starch and alginic acid; binding agents, e.g., starch, gelatin, and acacia, and lubricating agents, e.g., magnesium stearate, stearic acid and talc. The tablets may be uncoated or coated by known techniques to delay disintegration and absorption in the gastrointestinal tract, and thereby, provide a sustained action over a longer period. Similarly, suspensions, syrups and elixirs may contain the active ingredient in admixture with any of the conventional excipients utilized for the preparation of such compositions e.g., suspending agents (methylcellulose, tragacanth and sodium alginate), wetting agents (lecithin, polyoxyethylene stearate and polyoxyethylene sorbitan mono-oleate) and preservatives (ethyl-p-hydroxybenzoate). Capsules may contain, e.g., calcium carbonate, calcium phosphate and kaolin. The injectable compositions are formulated as known in the art and may contain appropriate dispersing or wetting agents and suspending agents identical or similar to those mentioned above. Topical formulations are also prepared by methods well known in the art and the active ingredient may be dissolved or dispersed in water, alcohol, oils, and waxes along with other ingredients such as dispersing agents, stabilizers, fragrances, coloring agents and the like commonly used in tinctures, ointments and creams. These pharmaceutical preparations may contain up to about 90% of the active ingredient in combination with the carrier or adjuvant.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid and, accordingly, are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate, maleate, malate, tartrate, methanesulfonate, cyclohexysulfamate and the like.

Although the anti-bacterial and anti-fungal effective dosage utilized in the treatment of bacteria and fungus infections will vary depending upon the compound employed and the mode of administration, in general, satisfactory results are obtained when these compounds are administered orally or parenterally for systemic use at a daily dosage of about 4 mg. to about 200 mg. per kilogram of animal body weight. This daily dosage is preferably administered 2 to 4 times a day, or in sustained release form. For most large mammals in need of said treatment, the total internal daily dosage is from about 100 mg. to about 6.0 mg., preferably from about 250 mg. to about 2.5 gms. Dosage forms suitable for internal use comprise about 25 to 3000 mg., preferably 62.5 milligrams to about 1250 milligrams of active compound in intimate admixture with a solid or liquid pharmaceutically acceptable carrier or diluent.

The preferred pharmaceutical compositions from the standpoint of preparation and ease of administration are tinctures, ointments, and creams used in topical administration containing from about 0.5 to 30 percent, preferably 0.5 to 10 percent by weight of the active ingredient.

EXAMPLES 1 AND 2

Tablets and Capsules Suitable for Oral Administration

Tablets and capsules containing the ingredients indicated below may be prepared by conventional techniques and are useful in treating bacteria and fungi at a dose of one tablet or capsule 2 to 4 times a day.

| Ingredient | Weight (mg) Tablet | Capsule |
|---|---|---|
| 3-Nitro-picolinonitrile | 100 | 100 |
| tragacanth | 10 | — |
| lactose | 197.5 | 250 |
| corn starch | 25 | — |
| talcum | 15 | — |
| magnesium stearate | 2.5 | — |
| TOTAL | 350 mg. | 350 mg. |

Similar tablets and capsules are prepared using 4-nitro-picolinonitrile in place of the 3-nitro-picolinonitrile above.

EXAMPLES 3 AND 4

Sterile Suspension for Injection and Oral Liquid Suspension

The following pharmaceutical compositions are formulated with the indicated amount of active agent using conventional techniques. The injectable suspension and oral liquid suspension represent formulations useful as unit doses which may be administered in the treatment of bacteria and fungi. The injectable suspension is suitable for administration twice a day whereas the oral liquid suspension is suitably administered 2 to 4 times per day for this purpose.

| Ingredients | Weight (mg) Sterile Injectable Suspension | Oral Liquid Suspension |
|---|---|---|
| 3-nitro-picolinonitrile | 125 | 150 |
| sodium carboxy methyl cellulose USP | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s. |
| methyl paraben, USP | — | 4.5 |
| propyl paraben, USP | — | 1.0 |
| polysorbate 80 (e.g. Tween 80) USP | — | 5 |
| sorbitol solution, 70% USP | — | 2,500 |
| buffer agent to adjust pH for desired stability | q.s. | q.s. |
| water | for injection q.s. to 1 ml. | q.s. to 5 ml |

Sterile injectable suspensions and oral liquid suspensions are similarly prepared using 4-nitro-picolinonitrile in place of the 3-nitro-picolinonitrile above.

EXAMPLE 5

Ointment for Topical Treatment

A water insoluble ointment for the topical treatment of bacterial and fungal infection is prepared using conventional methods according to the following formulation:

| | Weight (g.) |
|---|---|
| Cholesterol | 30 |
| Stearyl alcohol | 30 |
| White wax | 80 |
| White petrolatum | 860 |
| 3-nitro-picolinonitrile | 90 |

Similarly, the above ointment is prepared using 4-nitro-picolinonitrile in place of the 3-nitro-picolinonitrile.

EXAMPLE 6

Water Soluble Ointment

A water soluble ointment for treatment of topically disposed bacterial and fungal infections is prepared by standard techniques according to the following techniques:

|  | Weight (g.) |
| --- | --- |
| Polyethylene glycol (M.W. 4000) | 4000 |
| Polyethylene glycol (M.W. 400) | 800 |
| 3-nitro-picolinonitrile | 100 |

A similar ointment is prepared using 4-nitro-picolinonitrile in place of the 3-nitro-picolinonitrile.

EXAMPLE 7

Cream for Topical Application

A cream preparation for topical application of the active agent indicated below is prepared according to the following formulation using conventional techniques:

| Cetyl alcohol, grams | 9.2 |
| --- | --- |
| Stearyl alcohol, grams | 9.2 |
| Sodium lauryl sulfate, grams | 1.5 |
| White petrolatum, ml. | 30.0 |
| Propylene glycol, ml. | 10.0 |
| Distilled water to make total of grams | 100.0 |
| 3-nitro-picolinonitrile, grams | 10.0 |

A similar cream is prepared using 10 grams of 4-nitro-picolinonitrile in place of the above 3-nitro-picolinonitrile.

EXAMPLE 8

Preparation of 3-Nitro-picolinonitrile

A mixture of 15.4 g. of 2-chloro-3-nitro-pyrridine, 10.4 g. of cuprous cyanide and 27.8 g. of biphenyl is heated to form a melt at 205° C., and the melt is maintained at this temperature for 3 ½ hours. It is then poured into a mortar and pulverized and extracted with acetone. The acetone extracts are then poured into a stirred solution of 6N hydrochloric acid (HCl) solution and the solid which forms is filtered and washed with 2N HCl. The HCl solutions are combined, diluted with an equal volume of water and the solid filtered. The filtrate is extracted with methylene chloride, and the organic layer is separated, dried, and evaporated yielding 6.56 g. of a solid, m.p. 77°–87° C. The solid is chromatographed on a silica gel column to obtain 1.56 g. (11 percent) of 3-nitro-picolinonitrile, m.p. 75°–78° C.

What is claimed is:

1. A method of treating bacteria and fungi, which comprises internally or topically administering to a mammal in need of said treatment an anti-bacterial or anti-fungal effective amount of a compound of the formula:

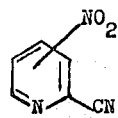

or a non-toxic pharmaceutically acceptable acid addition salt thereof.

2. A method according to claim 1 wherein said compound is administered internally at a daily dose of from about 100 milligrams to about 6.0 grams.

3. A method according to claim 1 wherein the compound is administered in a unit dosage form comprising said compound to the extent of from about 25 milligrams to about 3000 grams per unit dosage.

4. A method according to claim 1 wherein said compound is administered internally at a daily dose of from about 250 milligrams to about 2.5 grams.

5. A method according to claim 1 wherein the compound is administered in a unit dosage form comprising said compound to the extent of from about 62.5 milligrams to about 1.25 grams per unit dosage.

6. A method according to claim 1 wherein said compound is 3-nitro-picolinonitrile.

7. The method according to claim 1 wherein said compound is 4-nitro-picolinonitrile.

8. A method according to claim 1 wherein said compound is administered topically in an topical composition containing said compound in a concentration by weight of 0.5 to 30 percent.

9. A method according to claim 8 wherein the topical composition contains said compound in a concentration by weight of 0.5 to 10 percent.

10. The method according to claim 8 wherein said compound is 3-nitro-picolinonitrile.

11. The method according to claim 8 wherein said compound is 4-nitro-picolinonitrile.

12. A pharmaceutical composition in solid or sterile solution form useful in treating bacteria and fungus infections topically, comprising as the active ingredient thereof a compound of the formula:

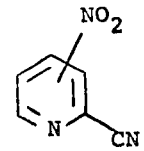

or a non-toxic pharmaceutically acceptable acid addition salt thereof, and a pharmaceutically acceptable carrier therefor, said compound being present in said composition at a concentration by weight of 0.5 to 30 percent.

13. A pharmaceutical composition according to claim 12 wherein said compound is present at a concentration by weight of 0.5 to 10 percent.

14. The pharmaceutical composition of claim 12 wherein the active ingredient is 3-nitro-picolinonitrile.

15. The pharmaceutical composition of claim 12 wherein the active ingredient is 4-nitro-picolinonitrile.

16. The pharmaceutical composition of claim 12 which is an ointment.

17. The pharmaceutical composition of claim 12 which is a topical cream.

18. A pharmaceutical composition in solid or sterile solution form useful in treating bacteria and fungus infections internally, comprising as the active ingredient thereof a compound of the formula:

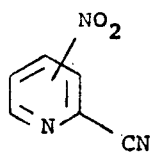

or a non-toxic pharmaceutically acceptable acid addition salt thereof, and a pharmaceutically acceptable carrier therefor, said compound being present in said composition in an amount by weight of from about 25 milligrams to about 3000 milligrams.

19. A pharmaceutical composition according to claim 18 in which said compound is present in said composition in an amount by weight of from about 62.5 milligrams to about 1,250 milligrams.

20. The pharmaceutical composition according to claim 18 wherein the active ingredient is 3-nitropicolinonitrile.

21. The pharmaceutical composition according to claim 18, wherein the active ingredient is 4-nitropicolinonitrile.

* * * * *